Sept. 1, 1953　　　　N. S. RODESCI　　　　2,650,598
DENTAL FLOSS IMPLEMENT
Filed June 23, 1952
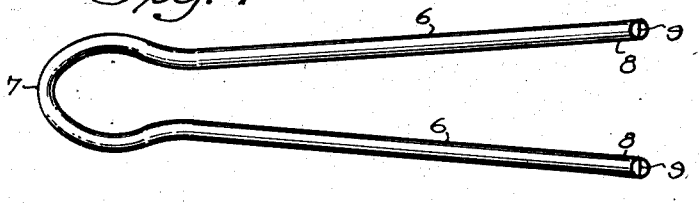
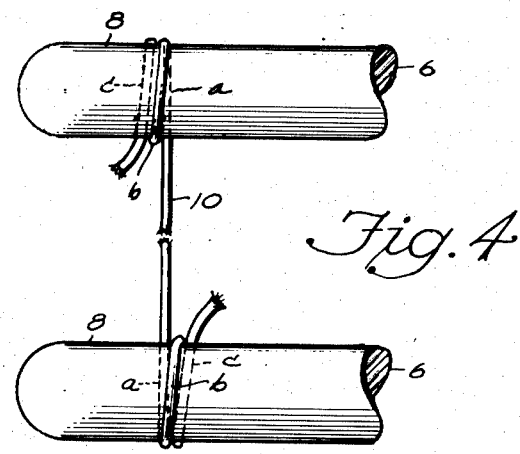
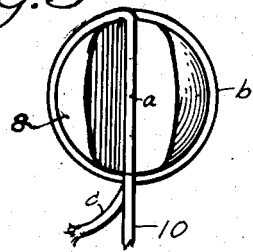
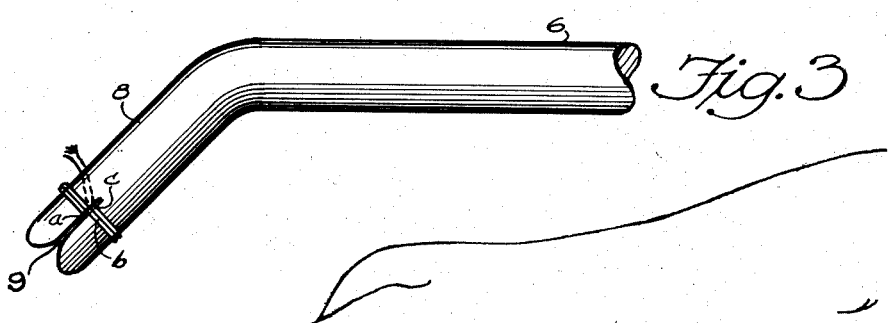
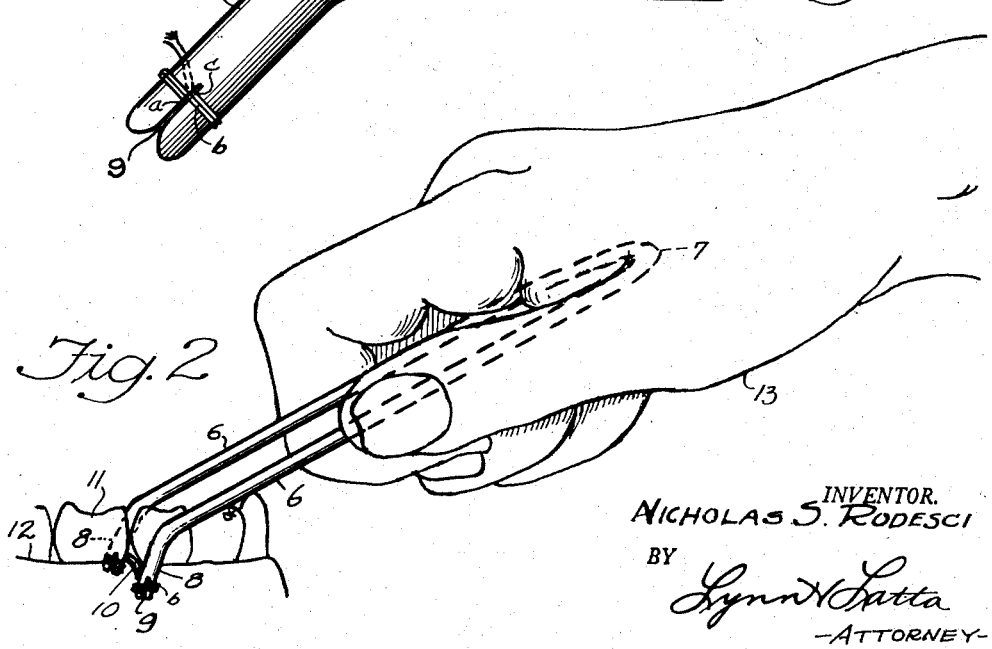
INVENTOR.
NICHOLAS S. RODESCI
BY
Lynn H Latta
—ATTORNEY—

Patented Sept. 1, 1953

2,650,598

UNITED STATES PATENT OFFICE 2,650,598

DENTAL FLOSS IMPLEMENT

Nicholas S. Rodesci, Los Angeles, Calif.

Application June 23, 1952, Serial No. 294,990

3 Claims. (Cl. 132—91)

This invention relates to the cleaning of teeth with dental floss and has as its general object to provide an improved implement utilizing a length of dental floss and having a holder which may be held in one hand, for manipulating the floss.

A further object is to provide an improved dental floss holder. Another object is to provide an improved dental floss holder which greatly facilitates the use of dental floss.

Another object is to provide a dental floss holder which in addition to its improved operating characteristics, is of relatively simple and inexpensive yet durable construction.

Other objects will become apparent in the ensuing specifications and appended drawings in which:

Fig. 1 is a plan view of a dental floss holder embodying the invention;

Fig. 2 is a perspective view showing the use of the instrument;

Fig. 3 is an enlarged fragmentary side view of one of the prongs of the holder;

Fig. 4 is an enlarged fragmentary plan view of the floss holding prongs of the holder; and Fig. 5 is an end view of one of the prongs.

Referring now to the drawings in detail, my improved dental floss implement comprises a holder, shown in Fig. 1, together with a length of dental floss which in Fig. 4 is shown attached to the holder.

The holder comprises a pair of arms 6, connected by a loop 7 and normally diverging substantially as shown in Fig. 1. The ends of the arms 6 are bent to form prongs 8, disposed in a common plane subtending an obtuse dihedral angle with reference to the plane of arms 6, as indicated in Fig. 3. The angle shown in the drawing is approximately 135°, although some variation either toward a more acute angle or a more obtuse angle, may be observed.

The ends of prongs 8 are fluted to provide floss receiving slots 9 having flaring mouths as shown in Fig. 3. The slots 9 lie in the common plane of prongs 8.

Dental floss 10 is secured to prongs 8 by threading the respective end portions thereof through slots 9 and winding them around prongs 8. Fig. 4 illustrates how the respective ends of the floss are secured to the respective prongs. The intermediate portion of the floss 10 which is stretched between the prongs, extends directly into the slots 9 at $a$. From the outer extremities of the portions $a$, the floss has portions $b$ wound about the respective prongs. From the extremities of portions $b$, end portions $c$ extend back through the respective slots 9 to the inner sides thereof. The method of attaching the floss is as follows: For a right handed person, the holder will be held in the palm of the left hand in the position shown in Fig. 1 with the prongs facing upwardly. Starting from the inner side of the slot in the upper prong of Fig. 1 (lower prong of Fig. 4), and with one end of the floss pinched against the inner side of said prong, the user will thread the floss (portion $c$) outwardly through the slot. The floss will then be given one turn (loop portion $b$), clockwise, around this prong and brought back through the slot in the opposite direction (portion $a$).

The floss is then stretched across between the prongs and threaded from the inside outwardly through the slot 9 of the upper prong as viewed in Fig. 4. This inserts the portion $a$ in the other prong. He then winds one turn of the floss (portion $b$) clockwise around the other prong bringing it to the outer side of the prong, and ends up by threading it (portion $c$) from the outside inwardly through the slot of the other prong. If this sequence of operation is followed with reference to Fig. 4, beginning with the lower prong of that figure, and ending with the upper prong, it is believed that it will be apparent from the drawing just how the floss is attached.

A detailed explanation of the attachment of the floss to the holder has been given for the reason that the invention provides for a very rapid, easy and yet efficient method of attaching the floss to the holder with sufficient security to avoid any possible slippage thereof in use. The threading of the floss twice through each slot and the winding of the floss one turn around each turn provides a snubbing action which positively locks it against any possibility of slipping. The ease of attachment is facilitated by the fact that the winding about both prongs is in a clockwise natural direction. Fig. 5 illustrates the upper prong of Fig. 1 with the floss attached thereto.

In attaching the floss, the arms 6 are drawn together slightly so as to place the prongs under slight tension, sufficient to maintain the floss in a straight line while it is being fitted into a crack between the teeth. With the floss attached, the arms 6 will approach a parallel relation and the spacing between the prongs 8 will be slightly greater than the normal transverse width of the widest molar tooth of a human jaw. The arms 6 will be sufficiently close together so that if desired the thumb may be inserted between the arms 6 to wedge them apart and thereby increase the tension on the floss while it is being used. Normally, the holder may be held in the hand as shown in Fig. 2, the floss inserted into the crack between adjacent teeth, and the holder then pressed toward the gums to force the floss between the teeth. The common method of using floss in which a length of floss is held between the fingers of both hands, and finger one is inserted into the mouth, is completely obviated. The angular relation between the planes of prongs 8 and arms 6 is such that the arms 6 are readily extended through the mouth with the prongs 8 in a position to straddle the teeth roughly parallel to the axes of the teeth, as indicated in Fig. 2. This likewise facilitates the use of the device.

The loop 7 is roughly a three quarter loop, and is connected to arms 6 by reverse bends, so that the arms 6 may be sufficiently close together to obtain the functions referred to above. Furthermore, with a three quarter loop, the loop 7 fits the palm of the hand and provides a more secure fulcrum for the manipulation of the device than would otherwise be possible.

The holder is made from a single length of wire which may be of an aluminum alloy of sufficient hardness to have a definite spring characteristic or on the other hand, may be of steel, plated with an inactive metal such as chromium so as to avoid any offensive taste or electrolytic action.

The slots 9 are of such a width as to receive conventional dental floss with a friction gripping fit. To this end, the slots are preferably in the neighborhood of approximately .01 inch in width.

I claim:

1. In combination, a dental floss holder including an open loop, a pair of arms joined integrally to the extremities of said loop by reverse bends, a pair of prongs on the free ends of said arms, said prongs each having one slot only with a width in the neighborhood of .01 inch, the length of each slot in its region of .01 inch width exceeding five times the width of the slots, a length of dental floss having each end portion thereof extending through a respective slot with the free end extremity thereof lying on the inner side of a respective prong, having a portion wound about a respective prong with a full turn, beginning at the outer extremity of the respective slot, and having portions extending inwardly through the respective slots from the extremities of said turns and continued to form an intermediate connecting portion stretched between the prongs.

2. The combination of claim 1 wherein the plane of the slot in one prong is common to the plane of the slot of the other prong and wherein the holder is formed from a continuous piece of rod material generally cylindrical in cross section.

3. In combination, a dental floss holder including an open loop, a pair of arms joined integrally to the extremities of said loop by reverse bends, a pair of prongs on the free ends of said arms, said prongs each having only one slot therein, the slot of each prong forming opposed walls which extend in substantially parallel relation to each other from the base of each slot throughout a major portion of the length of each slot, the width of each slot in the region of the parallel extent of the walls thereof being in the neighborhood of .01 inch and the length of the extent of the parallel condition of the walls of each slot being in excess of .07 inch, each slot lying in a plane common with the plane of the two prongs, a length of dental floss having each end portion thereof extending through a respective slot with the free end extremity thereof lying on the inner side of a respective prong, having a portion wound about a respective prong with a full turn, beginning at the outer extremity of the respective slot, and having portions extending inwardly through the respective slots from the extremities of said turns and continued to form an intermediate connecting portion stretched between the prongs, said length of dental floss being manually removable from the slots.

NICHOLAS S. RODESCI.

References Cited in the file of this patent

UNITED STATES PATENTS

| Number | Name | Date |
|--------|------|------|
| 1,166,732 | Woodhouse | Jan. 4, 1916 |
| 2,384,712 | Turenchalk | Sept. 11, 1945 |
| 2,443,415 | Buscarino | June 15, 1948 |